United States Patent
Kulmala (10) Patent No.: US 12,175,806 B2
(45) Date of Patent: Dec. 24, 2024

(54) PREDICTING RUNNING HOURS OF A MARINE VESSEL

(71) Applicant: WÄRTSILÄ FINLAND OY, Vaasa (FI)

(72) Inventor: Jyri Kulmala, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 468 days.

(21) Appl. No.: 17/602,427

(22) PCT Filed: Apr. 8, 2019

(86) PCT No.: PCT/FI2019/050284
§ 371 (c)(1),
(2) Date: Oct. 8, 2021

(87) PCT Pub. No.: WO2020/208288
PCT Pub. Date: Oct. 15, 2020

(65) Prior Publication Data
US 2022/0172524 A1 Jun. 2, 2022

(51) Int. Cl.
*G07C 5/04* (2006.01)
*B63H 21/21* (2006.01)
*G07C 5/08* (2006.01)

(52) U.S. Cl.
CPC .............. *G07C 5/04* (2013.01); *B63H 21/21* (2013.01); *G07C 5/0816* (2013.01); *G07C 5/0841* (2013.01)

(58) Field of Classification Search
CPC .......... B63H 21/21; G06Q 10/06; G07C 5/04; G07C 5/0816; G07C 5/0841
See application file for complete search history.

(56) References Cited

U.S. PATENT DOCUMENTS 6,694,908 B2 * 2/2004 Parsons .................... B63B 13/00
114/74 R
9,520,006 B1 * 12/2016 Sankovsky .............. G07C 5/02
(Continued)

FOREIGN PATENT DOCUMENTS

| CN | 205354022 U | * | 6/2016 | |
| CN | 104865075 B | * | 11/2020 | |
| GB | 2522728 A | * | 8/2015 | ........... G06F 1/3287 |

OTHER PUBLICATIONS

Dena et al., "Heterogeneous Industrial Vehicle Usage Predictions: A Real Case", Mar. 26, 2019 (Year: 2019).*

(Continued)

*Primary Examiner* — Babar Sarwar
(74) *Attorney, Agent, or Firm* — Buchanan Ingersoll & Rooney PC (57) ABSTRACT

The present disclosure relates to a computer-implemented method, a computing device and a computer program product for predicting running hour information of marine vessel engine. An exemplary method includes receiving engine installation information, receiving engine running hour information from an engine running hours storage system, receiving vessel identification and movement data and generating a dynamic engine running hour model by combining the engine installation information, the engine running hour information and the vessel identification and movement data. Predicted running hour information is predicted based on the dynamic engine running hour model.

15 Claims, 3 Drawing Sheets

(56) References Cited

U.S. PATENT DOCUMENTS

| | | | | |
|---|---|---|---|---|
| 10,354,230 B1* | 7/2019 | Hanson | ................. | G07B 15/00 |
| 2007/0139168 A1* | 6/2007 | Rennie | .................... | G08G 1/20 |
| | | | | 340/539.22 |
| 2017/0003684 A1* | 1/2017 | Knudsen | ............ | G01N 21/3504 |
| 2019/0283596 A1* | 9/2019 | Koebler | ................ | B60W 10/06 |

OTHER PUBLICATIONS

International Search Report (PCT/ISA/210) and Written Opinion (PCT/ISA/237) mailed on Oct. 15, 2019, by the European Patent Office as the International Searching Authority for International Application No. PCT/FI2019/050284.
Markudova, Dena, et al., "Heterogeneous Industrial Vehicle Usage Productions: A Real Case", retrieved from the internet: http://ceur-ws.org/Vol-2322/DARLIAP_13.pdf.

* cited by examiner

PREDICTING RUNNING HOURS OF A MARINE VESSEL

FIELD

The present invention relates to a method, a device or system and a computer program product related to predicting running hours for marine vessel services. More particularly, the invention relates to a computer-implemented method, a computer device or system and a computer program product that predicts running hours of engines of a marine vessel by intelligently combining input data from a plurality of data sources.

BACKGROUND

Automatic Identification System, AIS, is an automatic tracking system that uses transponders on ships and is used by vessel traffic services. Information provided by AIS equipment, such as unique identification, position, course, and speed of a marine vessel, can be collected, stored and displayed. AIS is intended to assist a vessel's watch standing officers and allow maritime authorities to track and monitor vessel movements. The International Maritime Organization's International Convention for the Safety of Life at Sea requires AIS to be fitted aboard international voyaging ships with 300 or more gross tonnage (GT), and all passenger ships regardless of size.

Various customer asset management information systems are commonly used by companies to manage for example their operations. Operations information managed by such customer asset management information systems may comprise for example sales, distribution, materials management, production planning, logistics execution and/or quality management.

The term service configurator refers to a system or a subsystem that comprises information on asset data in relation to an installed base of products that may provide aid in making of service agreements with customers by calculating maintenance work costs, spare parts cost, personnel cost and operations cost. For example, the service configurator may comprise installation information regarding parts used in the respective engine(s) of any particular vessel and information about amount and/or cost of labour associated to the parts or the engine that enables for example cost of maintenance work, personnel and operations associated to that particular engine or its parts, including spare parts.

DESCRIPTION OF THE RELATED ART

Currently, typical solution for collecting information on engine running hours of a marine vessel's engine or engines utilizes data collected with various sensors on board of a marine vessel. Collected data is typically stored locally at the marine vessel, for example in logs available for manual browsing. In some more advanced systems information on engine running hours may be transferred and stored in a customer asset management information system. In each case, such sensor-based data is prone to errors, and inaccurate or bad engine running hours data leads to unreliable running hours predictions. Thus, there is a need for an improved method of collecting engine running hours information that enables generation of more reliable engine running hours predictions.

SUMMARY

An object is to provide a method and apparatus so as to solve the problem of providing an improved estimate of running hours of a marine vessel engine. The objects of the present invention are achieved with a method according to the characterizing portion of claim 1. The objects of the present invention are further achieved with a computer device or system according to claim 14 and with a computer program product according to claim 15.

The preferred embodiments of the invention are disclosed in the dependent claims.

According to a first aspect, a computer-implemented method for predicting running hour information of marine vessel engine is provided, the method comprising receiving engine installation information, receiving engine running hour information from an engine running hours storage system, wherein said engine running hour information comprises data points obtained on basis of measurements performed at engine site, and wherein said data points have been transferred to and stored at the engine running hours storage system, receiving vessel identification and movement data, generating a dynamic engine running hour model by combining the engine installation information, the engine running hour information and the vessel identification and movement data, and determining predicted running hour information based on the dynamic engine running hour model.

According to a second aspect, the step of generating the dynamic engine running hour model comprises determining the predicted running hour information using cleaned engine running hour information, and the method further comprises cleaning the engine running hour information before said combining the engine installation information, the engine running hour information and the vessel identification and movement data.

According to a third aspect, said cleaning the engine running hour information comprises identifying data points that are inconsistent based on comparison of data points with reference running hour information, and removing identified inconsistent data points.

According to a fourth aspect, the data points comprised in the engine running hour information are identified as inconsistent, when daily average running hours information for at least one engine employed in a marine vessel with multiple main engines are not between 0 and 24 hours.

According to a fifth aspect, said generating the dynamic engine running hour model further comprises enriching the engine running hour information with vessel identification and movement data before determining the predicted running hour information.

According to a sixth aspect, said step of enriching comprises computing a vessel hours estimate on basis of the vessel identification and movement data, wherein the vessel hours estimate indicates number of hours the marine vessel was in motion on a given time period, and wherein the data points comprised in the engine running hour information are identified as inconsistent, when at least one of following conditions is fulfilled: engine running hours of a marine vessel with a single main engine on a given time period falls outside ±5% from the corresponding vessel hours estimate on the given time period, and/or engine running hours for main engines employed in a marine vessel with multiple main engines on a given time period are equal or higher than 105% of the corresponding vessel hours estimate on the given time period, and/or daily average running hours for at least one engine employed in a marine vessel with multiple main engines are not between 0 and 24 hours.

According to a seventh aspect, the method further comprises, when inconsistent data points are identified, analyzing data points comprised in the engine running hours storage system for finding longest sequence of data points that is consistent with the vessel hours estimate, and deleting any data points falling outside the longest sequence of data points that is consistent.

According to an eighth aspect, the method further enables user input to manually adjust and/or delete data points.

According to a ninth aspect, the vessel hours are obtained by accumulating times that the marine vessel was observed to be in motion.

According to a tenth aspect, the vessel hours comprises information on periods when the marine vessel was observed to be in motion, stationary or wherein its motion state was uncertain, and wherein a maximum estimate of the vessel hours is predicted by accumulating times that the marine vessel was observed to be in motion on in uncertain motion state, and wherein a minimum estimate of the vessel hours is predicted by deducting times that the marine vessel was in uncertain motion state from the accumulated time that the marine vessel was observed to be in motion, and wherein the average between the maximum and minimum running hour estimates is used as the vessel hours estimate.

According to an eleventh aspect, the vessel identification and movement data comprises Automatic Identification System (AIS) data.

According to a twelfth aspect, the vessel's speed is estimated by calculating a first speed estimate on basis of speed over ground (SOG) information of the vessel identification and movement data, and a second speed estimate as a ratio of distance travelled by the marine vessel obtained from GPS coordinates in the vessel identification and movement data and the corresponding time period using corresponding timestamps in the vessel identification and movement data. The vessel is considered to be stationary, when both the first and the second speed estimates are below predefined thresholds and the vessel is considered to be moving when both the first and the second speed estimates are above predefined thresholds, and the vessel's motion state is considered to be uncertain at any other times.

According to a thirteenth aspect, determining predicted running hour information comprises predicting the engine running hours for a future time period, and the prediction comprises estimating daily engine running hours on basis of historical engine running hour information stored in the engine running hours storage system, calculating a ratio of engine running hours to vessel hours based on the knowledge of current vessel hours from vessel identification and movement data, estimating current engine running hours based on the ratio and last known engine running hours, and predicting the engine running hours for a plurality of months ahead on basis of the estimated current engine running hours and the estimated daily engine running hours.

According to a fourteenth aspect, the method further comprises receiving the engine installation information comprising information of parts or spare parts used in any particular engine.

According to a fifteenth aspect, the method further comprises determining asset overhaul information on basis of the predicted running hour information and the engine installation information.

According to a sixteenth aspect, the asset overhaul information comprises service plan information including maintenance activities for pre-defined components to be inspected or changed according to certain running hours, wherein each maintenance activity includes service job information and/or spare part information.

According to another aspect, a computing device or system is provided comprising a processor and a memory and being configured to predict running hour information of marine vessel engine, characterized in that the computing device or system comprises means for carrying out the method according to any one of the above aspects.

According to a further aspect, computer program product having instructions for performing the method according to any one of the above aspects one to sixteen, when executed by a computing device or system.

According to a yet further aspect, a computer program product embodied on a non-transitory computer readable medium is provided, the computer program product comprising instructions stored thereon to cause one or more processors or data processing systems to perform any of the aspects one to sixteen.

The present invention is based on the idea of combining information from a plurality of data sources in order to generate a prediction of running hours of one or more engines of a marine vessel, wherein the data comprises engine installation information, customer asset management information and vessel identification and movement data. Even further information sources may be added to improve the prediction and to add informative details.

The present invention has the advantage that it improves coverage and accuracy of data used for preparing a running hours prediction. Thus, an improved prediction can be obtained, so that transparency of installation specific potential for overhaul services is greatly improved, as maintenance needs can be predicted in a reliable manner on basis of the predicted running hour information. Reliable operation of the installed base of marine vessel engines can be facilitated, and overhaul services can be timely planned. Thus, minimum disruptions in operation of the marine vessels are caused due to malfunction or maintenance periods of its engines. The invented system can be utilized for example by a company managing a fleet of marine vessels or by a company providing overhaul services for an installed base of marine vessel engines.

BRIEF DESCRIPTION OF THE DRAWINGS

In the following the invention will be described in greater detail, in connection with preferred embodiments, with reference to the attached drawings, in which.

DETAILED DESCRIPTION

The invention is preferably implemented with a computing device or system that comprises means for carrying out the method according to the invention described. The invention may comprise a computer program product having instructions for performing the disclosed method when executed by a computing device or system. The computer program product is stored on a computer-readable medium.

The term "computing device" refers to any electronic device comprising a processor, such as a general-purpose central processing unit (CPU), a specific purpose processor or a microcontroller. A computing device is capable of receiving data (an input), of performing a sequence of predetermined operations thereupon, and of producing thereby a result in the form of information or signals (an output). Depending on context, the term "computing system" will mean either a processor in particular or can refer more generally to a processor in association with an assemblage of interrelated elements contained within a single case or housing. A computing system refers to a system comprising a plurality of computing devices, wherein at least one computing device in the system perform steps of the method. As known in the art, different steps of the method may be performed in different computing devices, and/or some steps may be performed by a plurality of computing devices for example for load sharing purposes.

A "computer-readable medium" can be any means that can contain, store communicate, propagate or transport the program for use by or in connection with the instruction execution system, apparatus or device. The computer readable medium can be, for example, but not limited to, an electronic, magnetic, optical, electromagnetic, infrared or semiconductor system, apparatus, device or propagation medium. A non-exhaustive list of more specific examples of the computer-readable medium can include the following: an electrical connection having one or more wires, a portable computer diskette or memory device, a random access memory (RAM), a read-only memory (ROM), an erasable programmable read-only memory (EPROM or Flash memory), an optical fiber, and a portable compact disc read-only memory (CDROM).

Vessel identification and movement data may comprise Automatic Identification System (AIS) data, for example. The vessel identification and movement data may be generated and maintained based on information received from vessel transponder data and at least one of the following: satellite network based data and terrestrial network based data. Vessel identification and movement data may comprise vessel ID, vessel position, vessel course, vessel speed (ground speed, through water speed etc.).

Figure 1:
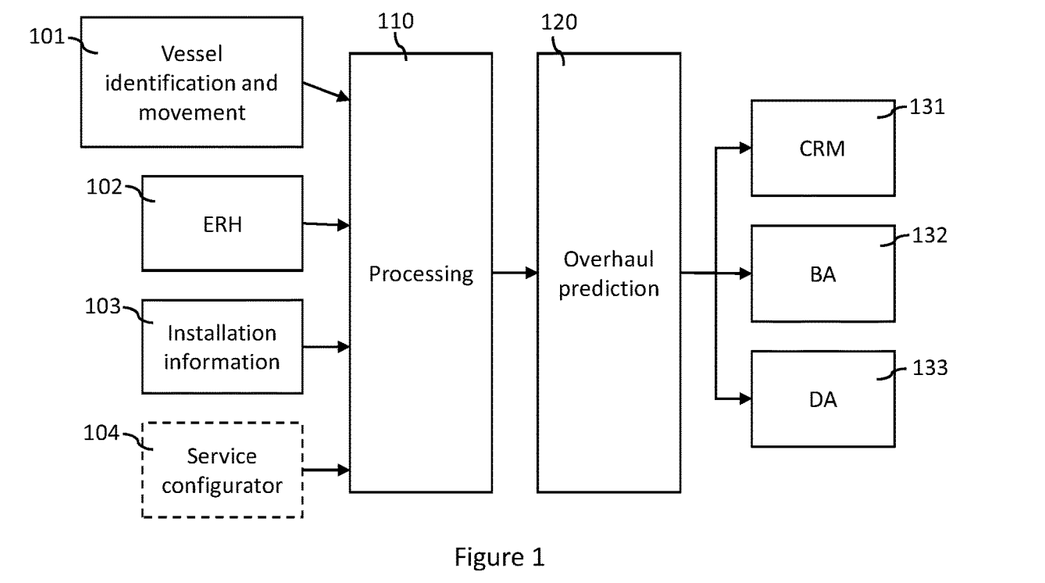
FIG. 1 is a schematic illustration of a system.

The FIG. 1 schematically illustrates a system according to the invention. Data is obtained from a plurality of data sources that reside outside the system, which data sources comprise information related to marine vessels and an installed base of marine vessel engines onboard these marine vessels. The data sources comprise vessel identification and movement system (e.g. Automatic Identification System (AIS) or equivalent) (101), an engine running hours storage system ERH (102) and an installation information system (103). The system may further comprise a service configurator (104), which is optional as indicated with the dashed line. The service configurator (104) is configured to provide asset data and/or engine installation information. Any type of engine running hours storage system may be used as a data source. The engine running hour data storage system (102) may be implemented for example by a Condition Based Maintenance system (CBM), or engine running hour data initially stored in a CBM system may further be transferred or copied and stored into a customer asset management platform, such as SAP or Salesforce, which may implement the needed engine running hour data storage system functionalities, so that engine running hour information for an entire fleet of vessels and a plurality of installations can be made easily available for further analysis.

A computing device or system implementing the invention is configured to perform processing (110) of the obtained data to produce a dynamic engine running hour model, and on basis of the model, the computing device or system is further configured to determine predicted running hours information. The predicted running hours information can be further utilized for producing a prediction of overhaul services (120). The overhaul prediction may be performed by the same computing device or system as the preceding processing, or it may be performed by a separate computing device or system. Overhaul prediction may then be utilized as input for example for a customer relationship management system (CRM), such as Salesforce, (131), a business analytics and intelligence tool or platform, (BA) (132) or a data analytics tool or platform (DA) (133), enabling proactive triggering of service overhaul activities or proposals for any installation of marine vessel.

In an embodiment, the asset overhaul information comprises service plan information including maintenance activities for pre-defined components to be inspected or changed according to certain running hours, wherein each maintenance activity includes service job information and/or spare part information. The service plan information may be maintained within the service configurator (104), for example.

Figure 2:
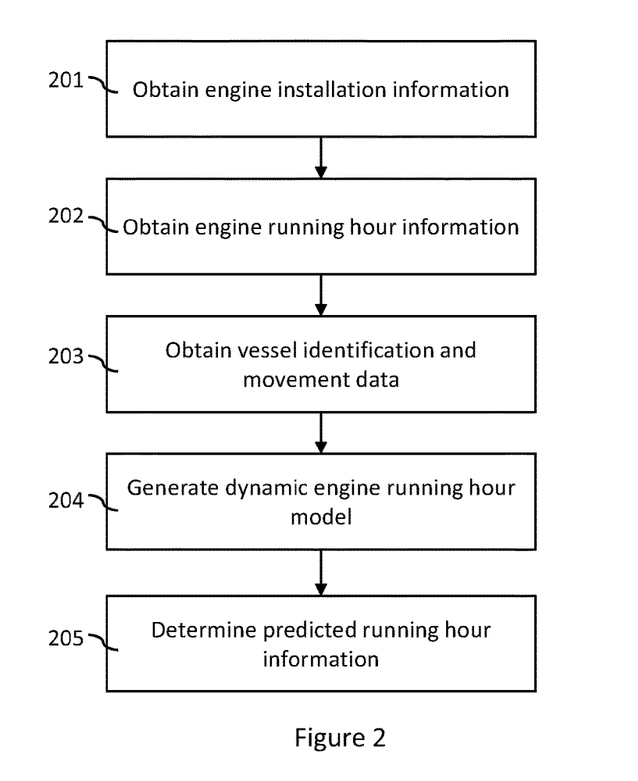
FIG. 2 is a flow chart of data processing steps.

FIG. 2 shows schematically an overview of the data processing steps according to the invention.

In the step 201, engine installation information is obtained. Engine installation information preferably comprises main information enabling identification and/or characteristics of marine vessels and/or engines installed on those marine vessels. Engine installation information preferably comprises for example installation, system, equipment and/or material level information concerning the respective marine vessel and/or installation. For example, the engine installation information may comprise at least one of vessel identification, engine type, engine serial number and engine configuration for each installed engine. Engine configuration information may comprise information that enables component code level resolution of components used in the respective engine.

In the step 202, engine running hour information is obtained from an engine running hours storage system. Engine running hour information comprises at least data points obtained on basis of measurements performed at engine site. Data points may be acquired for example on basis of measurements made with one or more sensors installed on board the marine vessel. As a non-limiting example, engine running hour information may be acquired with one or more Condition Based Maintenance, CBM, sensor measurements, which are stored as data points in the engine running hours storage system and subsequently used as engine running hour information. The CBM system continuously keeps track of the accumulated hours that an engine has been running. An existing Sensor Data Application Programming Interface, API, developed for CBM diagnostic tools may thus be reused to provide the latest running hour data to the engine running hours storage system as well.

Running hours measured from plurality of engines located in different marine vessels and power plants can be automatically transferred from CBM to the engine running hours storage system for instance once a week. However, in practice, data may be stored in the customer asset management on varying intervals depending for example on availability of data communication connections between the CBM system and the engine running hours storage system. Thus, periods between data points in the engine running hours storage system may vary, including but not limited to the running hours data points. Therefore, data points preferably include information on time, for example date, on which the data point has been received. The running hours data point preferably comprises running hour data at the day of transferring the data to the engine running hours storage system.

In the step 203, vessel identification and movement data is obtained. As known in the art, vessel identification and movement data comprises information on position, course, and speed regarding individual marine vessels. Information is assigned to an individual marine vessel based on unique identification and includes also time stamps corresponding to the stored data points.

Information obtained in the steps 201, 202 and 203 come from mutually independent data sources. Therefore, order of performing steps 201, 202 and 203 can be altered freely without departing from the scope of the invention. However, preferably all three types of data are provided to provide a more reliable and accurate prediction of running hours.

In the step 204 a dynamic engine running hour model is generated by combining the engine installation information, the engine running hour information and the vessel identification and movement data. Combination of vessel identification and movement data with the engine customer data comprising the engine installation information and the engine running hour information gives an enhanced dynamic engine running hour model compared to prior art that facilitates improved accuracy and reliability of the engine running hour model.

In the step 205 predicted running hour information is predicted on basis of the dynamic engine running hour model.

Figure 3:
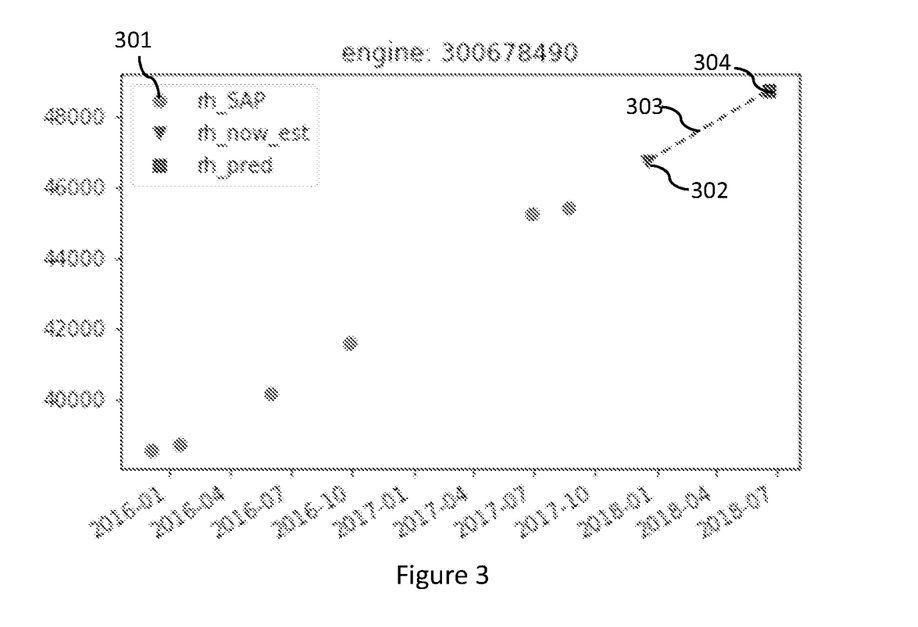
FIG. 3 is an example of input and output data from a dynamic engine running hour model.

FIG. 3 illustrates example of inputs and outputs of a dynamic engine running hour model and prediction of engine running hours for an exemplary engine, identified with a unique identification "engine: 300678490". In this example, prediction is made for 180 days from the current date. Historical engine running hour data points "rh_SAP" from the engine running hours storage system are shown as a plurality of dots (301). These data points represent cumulative engine running hours at specific points of time in history. Current engine running hours data point "rh_now_est" (302) is estimated on basis of the historical engine running hours data points. The dynamic engine running hour model provides an estimated slope (303), which in this example is 10.99 hours/day, and the predicted hours "rh_pred" (304) for 18 months ahead have then calculated on basis of the current running hours and the estimated slope.

Figure 4:
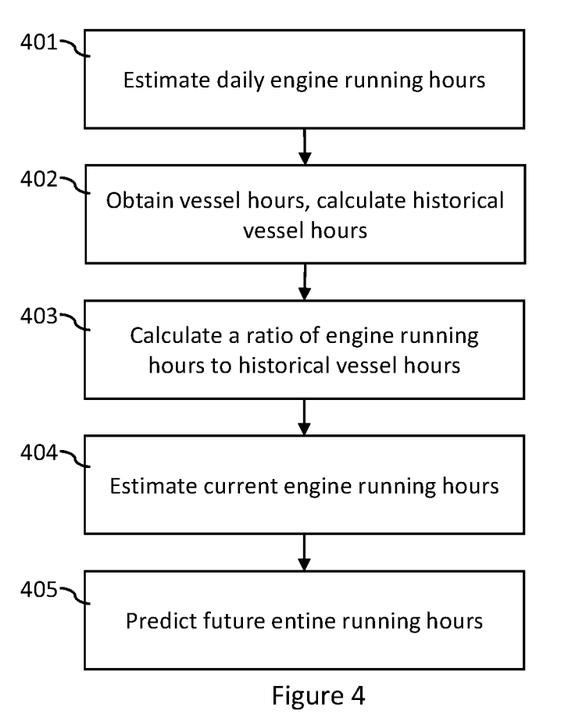
FIG. 4 shows a flow chart of an exemplary method for producing estimates for current and predicted running hours.

FIG. 4 illustrates a flow chart of an exemplary embodiment of the method that produces estimates for current and predicted running hours illustrated in the FIG. 3.

In the step 401, daily engine running hours 'RH_i' are estimated using the engine running hour information stored in the engine running hours storage system. The daily running hours are preferably estimated by calculating a weighted average of the past slopes, in other words slopes calculated between dividing difference between two data points of running hours data with the number of days between the respective data points. Preferably the data points used for calculating each past slope represent two consecutive engine running hours data points obtained from the engine running hours storage system, which consecutive data points define a period 'I' in time. In one example, the weighted average may be exponentially weighted so that most recent of the past slopes receive a higher weight than old past slopes. The calculated daily engine running hours may be referred to as a slope, 's_now', which corresponds to the slope of the line 303 in the FIG. 3.

In the step 402, vessel hours information is obtained from the vessel identification and movement data, and on basis of this information historical vessel hours 'VH_i' are calculated, preferably for the same periods 'I' that were used in the step 402. However, it is possible that vessel hours information is not always available, or vessel hours information does not fully overlap in time with the periods 'I' of the engine running hours.

In the step 403, a current ratio 'a now' is calculated. First, the historical daily engine running hours are divided with the historical vessel hours for each respective period 'i' for obtaining past slopes 'α_i':

α_i=RH_i/VH_i

The current ratio 'α_now' may then be calculated by computing an exponentially weighted average of the past slopes 'α_i':

α_now=sum(w_i*α_i)/sum(w_i), where weights 'w_i' decay exponentially from the current date 'd_now' as w_i=exp(-γ(d_now-d_i))

where 'd_i' is the end date of the ith period and 'γ' is a forgetting factor.

The weights 'w_i' used in the computation thus decay exponentially from the current day towards the past, and the weight is the smaller the further in the past the period of the respective past slope is. This way the most recent engine running hours can be given more emphasis in the prediction.

In the step 404, the current ratio is preferably used to calculate an estimate of current engine running hours (302). The estimate is preferably calculated by adding to the last/latest known running hours data point 'RH_last' a product of the current total of current vessel hours up 'VH_now' to now and the current ratio 'α_now':

RH_now=RH_last+α_now*VH_now

However, if current ratio cannot be estimated due to lack of vessel identification and movement data or due to no overlap between vessel identification and movement data and engine running hours storage system data, current running hours can be estimated with help of the daily running hours estimate received as a result of the step 401. In this case, the current running hours are received by summing with the last available running hours data point 'RH_last' a product of the daily running hours estimate 's_now', in other words the first slope, and the amount of days lapsed from the date of the last available running hours estimate 'd_last' until today 'd_now':

RH_now=RH_last+s_now*(d_now-d_last)

In the step 405, the future engine running hours (304) are predicted for plurality of months ahead on basis of the estimated current engine running hours and the estimated daily engine running hours. For example, the prediction may be made for 6 months, in which case the multiplier used may be for example 180 days:

RH_pred=RH_now+s_now*180

Instead of assuming 30-day months, calculation may also be performed using the actual number of days calculated on basis of a calendar. The prediction may naturally be calculated for any period of time by replacing the number of days with a different number of days. Predicted running hours may be computed for all engines that have at least 2 running hour measurements, in other words at least one period in the running hour data available in the engine running hours storage system for calculating the slope.

In an embodiment of the invention engine running hour information from the engine running hours storage system is cleaned before it is combined with the engine installation information, the engine running hour information and the vessel identification and movement data. Subsequently, the dynamic engine running hour model is generated using cleaned engine running hour information.

Cleaning the engine running hour information preferably comprises identifying data points that are inconsistent and removing such inconsistent data points. For example, data points comprised in the engine running hour information may be identified as inconsistent, when daily average running hours information for at least one engine employed in a marine vessel with multiple main engines are not between 0 and 24 hours. Removing of inconsistent data points may be performed automatically by the computing device or system data based on comparison of the data points with reference running hour information. Alternatively, or in addition, removing of inconsistent data points may be performed manually by a user. In addition, or alternatively to removing inconsistent data points, the user may be allowed to adjust data points.

In an embodiment of the invention engine running information from the engine running hours storage system may be enriched using vessel identification and movement data before predicted engine running hour information is determined. Sub-process of enriching engine running information may begin by computing a vessel hours estimate on basis of the vessel identification and movement rata. The vessel hours estimate indicates number of hours the marine vessel was in motion on a given time period. Vessel hours are obtained by accumulating times that the marine vessel was observed to be in motion. The term "vessel hours" refers in general to the time the marine vessel is determined to have been in operation, in other words moving using its engines. Vessel hours may be expressed using any applicable time unit, such as months, weeks, days, hours, minutes or seconds. A unit often used in the art for vessel hours is hours per day, wherein the hours may be expressed as an integer or as a decimal number, or as hours and minutes. Instead of a day, any time period may be selected as the basis. For example, the time period may applied be the time period lapsed since vessel identification and movement data was obtained last time. Vessel hours may also be expressed as a percentage or as a fraction that indicates a portion of a defined reference time period or a portion of an estimated operation lifetime of the engine or the vessel the vessel has been moving. Like the vessel hours, also engine running hours and predicted running hours may be expressed using any applicable unit chosen to be utilized in the system. Hours and/or hours per day are preferred units that provide suitable granularity and sufficient accuracy for calculations and estimations and also for illustration of measurement and prediction results.

When engine running information is cleaned and/or enriched, data points comprised in the engine running hour information are analyzed in order to identify any inconsistent data points.

In a first implementation example, engine running hours of a marine vessel with a single main engine are analyzed and compared with the vessel hours obtained from the vessel identification and movement data. If the engine running hours obtained on basis of the engine running hours storage system on a given time period falls outside ±5% from the corresponding vessel hours estimate on the given time period, the engine running hours data point(s) for this time period is/are identified as inconsistent.

In a second implementation example, engine running hours for main engines employed in a marine vessel with multiple main engines are analyzed and compared with the vessel hours obtained from the vessel identification and movement data. If the engine running hours obtained on basis of the engine running hours storage system on a given time period are equal or higher than 105% of the corresponding vessel hours estimate on the given time period, the engine running hours data point(s) for this time period are identified is/are identified as inconsistent.

In a third implementation example, engine running hours of an engine other than a main engine in a marine vessel with multiple main engines is analyzed. If daily average running hours for such other engines employed in a marine vessel with multiple main engines are not between 0 and 24 hours, the engine running hours data is identified as inconsistent.

When inconsistent data points are identified, data points comprised in the engine running hours storage system representing the stored engine running hours are analyzed for finding longest sequence of data points that is consistent with the vessel hours estimate. Any data points falling outside the longest sequence of data points that is consistent are removed to ensure that no inconsistent data is used in the subsequent dynamic engine running hour model generation and running hours prediction.

Vessel hours may comprise information on periods when the marine vessel was observed to be in motion, stationary or wherein its motion state is uncertain. In one embodiment, the vessel hours are simply obtained by selecting the vessel hours when the vessel was observed to be in motion. Such selection may be made for example by obtaining speed over ground data from the vessel identification and movement data, or by calculating an estimated speed on basis of GPS data indication geographical location of the marine vessel and respective time stamps.

In an alternative, further determination of the vessel hours is performed for determining a more reliable estimate of the actual vessel hours. For this purpose, a maximum estimate of the vessel hours may be predicted by accumulating times that the marine vessel was observed to be in motion on in uncertain motion state. Further, a minimum estimate of the vessel hours may be predicted by deducting times that the marine vessel was in uncertain motion state from the accumulated time that the marine vessel was observed to be in motion. For obtaining the final vessel hours estimate, an average between the maximum and minimum running hour estimates may be calculated, and this average is used as the vessel hours estimate.

For determining, whether the marine vessel is in motion, stationary or its motion state is uncertain, the vessel's speed may be estimated. For a reliable vessel speed estimate, a calculation may be performed as illustrated in the FIG. 5.

Figure 5:
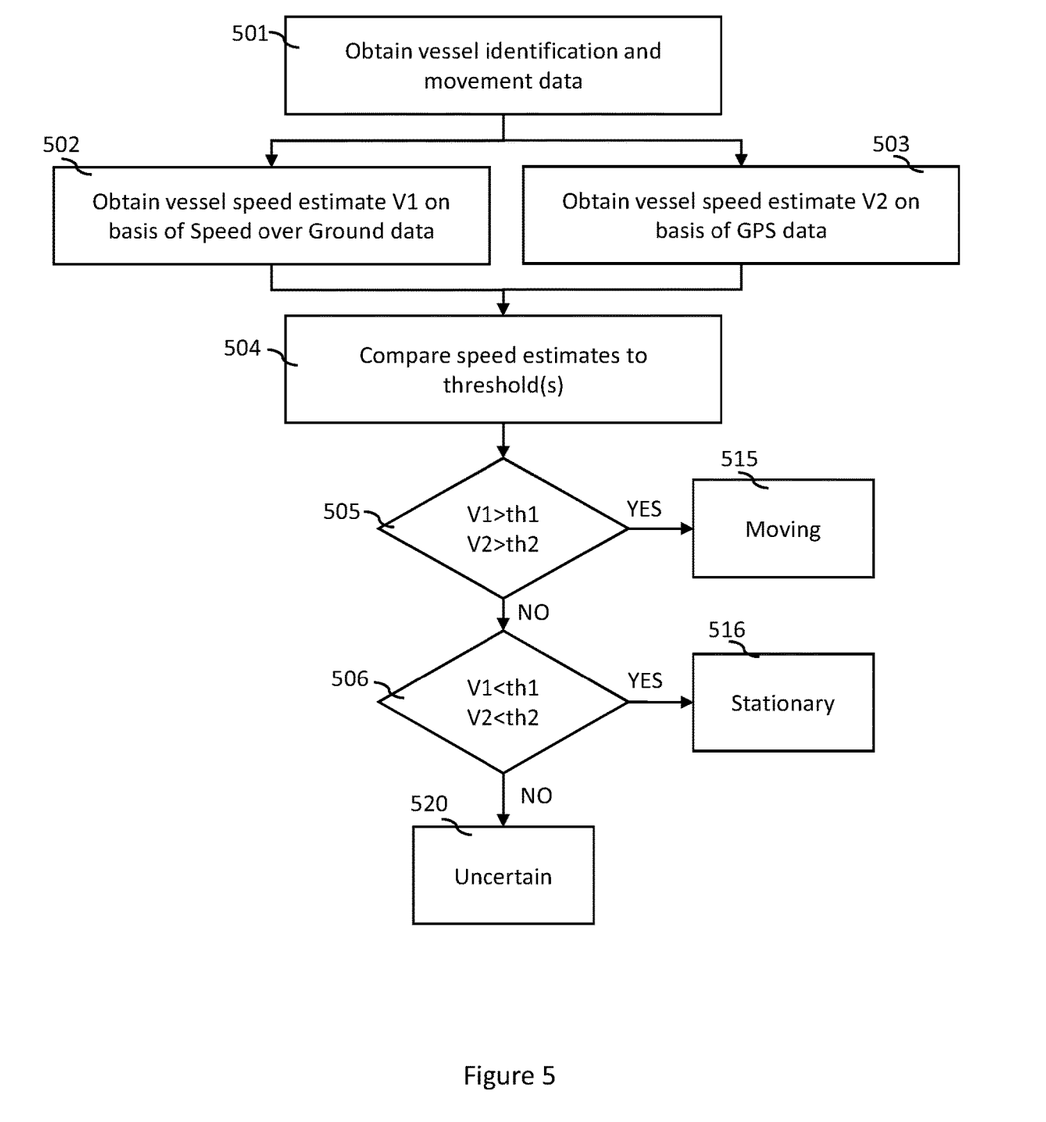
FIG. 5 illustrates a method for calculating a vessel speed estimate.

In the step 501, vessel identification and movement data, such as AIS data, is obtained.

In the step 502, a first speed estimate V1 is obtained on basis of speed over ground (SOG), field in the vessel identification and movement data.

In the step 503, a second speed estimate V2 is obtained as the ratio of distance travelled by the marine vessel obtained from GPS coordinates in the vessel identification and movement data and the corresponding time period using corresponding timestamps in the vessel identification and movement data.

In the step 504, both the first and second speed estimates (V1, V2) are then compared to one or more thresholds to determine whether the marine vessel is in motion, stationary or the motion state is uncertain. In this example, we have two thresholds, th1 and th2. Threshold values (th1, th2) may be the same, or they may be different. Illustrated by the decision box 505, the marine vessel is considered to be moving (515) when both the first and the second speed estimates are above predefined thresholds. Illustrated by the decision box 505, the marine vessel is considered to be stationary (516), when both the first and the second speed estimates are below predefined thresholds. The marine vessel's motion state is considered to be uncertain (520) at any other times, in other words whenever the comparison of the speed estimates give a non-uniform result, where one of the comparisons indicates that the speed is below the respective threshold and the other one of the comparisons indicates that the speed is above the respective threshold. As understood by a skilled person, comparison of the speed estimates to the threshold value can be made in any order without departing from the scope.

As disclosed in the FIG. 1, the system may further be configured to obtain information from a dynamic Service Configurator (SC), which enables inclusion of engine installation information in the prediction. Engine installation information obtained from the service configuration preferably comprises information of parts used in any particular engine. Different parts of an engine wear out with different speed and require overhaul at different times. By combining engine installation information with the predicted running hour information, engine overhaul information can be predicted. Thus, the system may accurately predict specific overhaul service needs of any particular engine, wherein the prediction also indicates which parts of the engine need special attention during the service overhaul.

In an embodiment, asset overhaul information is determined on basis of the predicted running hour information and the engine installation information. The asset overhaul information may comprise, for example, service plan information including maintenance activities for pre-defined components to be inspected or changed according to certain running hours, wherein each maintenance activity includes service job information and/or spare part information. The service plan information may be maintained within the service configurator (104), for example.

A benefit from including Service Configurator data in the prediction is that required scheduled service overhaul need can be determined and overhaul scope for each particular engine can be determined. Further, the asset overhaul information preferably includes labour information, in other words information on type and cost of service work required for any specific engine or engine part which may further be associated with required competences and optionally also experience of human resources fit to perform the service work. By including labour information in the prediction, availability of human resources required to perform the required overhaul service work as well as costs of the service overhaul work may be predicted.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A computer-implemented method for operating a marine vessel asset management information system, wherein the method comprises steps of:
  receiving, by a service configurator, input data from plural data sources, the input data including:
    marine vessel engine installation information;
    marine vessel engine running hour information from a marine vessel engine running hours storage system, wherein said marine vessel engine running hour information includes data points obtained on a basis of measurements performed at a marine vessel engine site, and wherein said data points have been transferred to and stored at the marine vessel engine running hours storage system;
    marine vessel identification and movement data;
  generating, by the service configurator, a dynamic marine vessel engine running hour model by:
    combining the marine vessel engine installation information, the marine vessel engine running hour information and the marine vessel identification and movement data; and
    enriching the marine engine running hour information with marine vessel identification and movement data before determining the predicted running hour information, wherein said step of enriching comprises:
    computing a marine vessel hours estimate on a basis of the marine vessel identification and movement data, wherein the marine vessel hours estimate indicates a number of hours the marine vessel was in motion on a given time period; and
    identifying that data points in the marine vessel engine running hour information are inconsistent, when at least one of the following conditions is fulfilled:
      marine vessel engine running hours of the marine vessel with a single main marine vessel engine on a given time period falls outside ±5% from the corresponding marine vessel hours estimate on the given time period;
      marine engine running hours for main marine vessel engines employed in the marine vessel with multiple main marine vessel engines on a given time period are equal or higher than 105% of a corresponding marine vessel hours estimate on the given time period; and/or
      daily average running hours for at least one marine vessel engine employed in the marine vessel with multiple main marine vessel engines are not between 0 and 24 hours;
    determining, via the service configurator, predicted running hour information based on the dynamic marine vessel engine running hour model;
  performing, via the service configurator, the following:
    when inconsistent data points are identified, analyzing data points in the marine vessel engine running hours storage system for finding a longest sequence of data points that is consistent with the marine vessel hours estimate;
    deleting any data points falling outside the longest sequence of data points that is consistent;
    generating service schedule for the marine vessel engine; and
    transmitting the service schedule to a processor of the marine vessel asset management information system; and
  setting and/or adjusting, via the processor of the marine vessel asset management information system, a maintenance schedule for the marine vessel engine based on the service schedule.

2. The method according to claim 1, the step of generating the dynamic engine running hour model comprises:
  determining the predicted running hour information using cleaned marine vessel engine running hour information, and the method comprises a step of:
  cleaning the marine vessel engine running hour information before said combining of the marine vessel engine installation information, the marine vessel engine running hour information and the marine vessel identification and movement data.

3. The method according to claim 2, wherein said cleaning the marine vessel engine running hour information comprises:
- identifying data points that are inconsistent based on comparison of data points with reference running hour information; and
- removing identified inconsistent data points.

4. The method according to claim 3, comprising:
- identifying data points in the marine vessel engine running hour information as inconsistent, when daily average running hours for at least one marine vessel engine employed in the marine vessel with multiple main marine vessel engines are not between 0 and 24 hours.

5. The method according to claim 1, comprising:
- enabling a user input to manually adjust and/or delete data points.

6. The method according to claim 1, comprising:
- obtaining the marine vessel hours by accumulating times that the marine vessel was observed to be in motion.

7. The method according to claim 6, wherein the marine vessel hours includes information on periods when the marine vessel was observed to be in motion, stationary or wherein its motion state was uncertain, and wherein the method comprises:
- predicting a maximum estimate of the marine vessel hours by accumulating times that the marine vessel was observed to be in motion on in uncertain motion state; and
- predicting a minimum estimate of the marine vessel hours by deducting times that the marine vessel was in uncertain motion state from the accumulated time that the marine vessel was observed to be in motion; and
- using an average between the maximum and minimum running hour estimates as the marine vessel hours estimate.

8. The method according to claim 7, comprising:
- estimating a marine vessel's speed by calculating:
  - a first speed estimate based on speed over ground (SOG) information of the marine vessel identification and movement data; and
  - a second speed estimate as a ratio of distance travelled by the marine vessel obtained from GPS coordinates in the marine vessel identification and movement data and the corresponding time period using corresponding timestamps in the marine vessel identification and movement data; and
  - considering the marine vessel is stationary, when both the first and the second speed estimates are below pre-defined thresholds, and considering the marine vessel to be moving when both the first and the second speed estimates are above predefined thresholds, and considering the marine vessel's motion state to be uncertain at any other times.

9. The method of claim 1, wherein the marine vessel identification and movement data includes Automatic Identification System (AIS) data.

10. The method according to claim 1, wherein determining predicted running hour information comprises:
- predicting the marine vessel engine running hours for a future time period, the predicting comprising steps of:
- estimating daily marine vessel engine running hours on a basis of historical marine vessel engine running hour information stored in the marine vessel engine running hours storage system;
- calculating a ratio of marine vessel engine running hours to marine vessel hours based on a knowledge of current vessel hours from marine vessel identification and movement data;
- estimating current marine vessel engine running hours based on a ratio and last known marine vessel engine running hours; and
- predicting the marine vessel engine running hours for a plurality of months ahead based on the estimated current marine vessel engine running hours and the estimated daily marine vessel engine running hours.

11. The method according to claim 1, wherein the method comprises:
- receiving marine vessel engine installation information which includes information of parts or spare parts used in any particular marine vessel engine.

12. The method according to claim 11, wherein the method comprises:
- determining asset overhaul information based on the predicted running hour information and the marine vessel engine installation information.

13. The method according to claim 12, wherein the asset overhaul information comprises:
- service plan information including maintenance activities for pre-defined components to be inspected or changed according to certain running hours, wherein each maintenance activity includes service job information and/or spare part information.

14. A computing device or system comprising a processor and a memory, the computing device or system being configured for operating a marine vessel asset management information system, wherein the computing device or system is configured for carrying out a computer-implemented method which includes steps of:
- receiving, by a service configurator, input data from plural data sources, the input data including:
  - marine vessel engine installation information;
  - marine vessel engine running hour information from the marine vessel engine running hours storage system, wherein said marine vessel engine running hour information includes data points obtained on a basis of measurements performed at a marine vessel engine site, and wherein said data points have been transferred to and stored at the marine vessel engine running hours storage system;
  - marine vessel identification and movement data;
- generating, by the service configurator, a dynamic engine running hour model by:
  - combining the marine vessel engine installation information, the marine vessel engine running hour information and the marine vessel identification and movement data; and
  - enriching the marine engine running hour information with marine vessel identification and movement data before determining the predicted running hour information, wherein said step of enriching comprises:
    - computing a marine vessel hours estimate on a basis of the marine vessel identification and movement data, wherein the marine vessel hours estimate indicates a number of hours the marine vessel was in motion on a given time period; and
    - identifying that data points in the marine vessel engine running hour information are inconsistent, when at least one of the following conditions is fulfilled:
      - marine vessel engine running hours of the marine vessel with a single main marine vessel engine on a given time period falls outside ±5% from the corresponding marine vessel hours estimate on the given time period;

marine engine running hours for main marine vessel engines employed in the marine vessel with multiple main marine vessel engines on a given time period are equal or higher than 105% of a corresponding marine vessel hours estimate on the given time period; and/or daily average running hours for at least one marine vessel engine employed in the marine vessel with multiple main marine vessel engines are not between 0 and 24 hours;

determining, via the service configurator, predicted running hour information based on the dynamic marine vessel engine running hour model;

performing, via the service configurator, the following:

when inconsistent data points are identified, analyzing data points in the marine vessel engine running hours storage system for finding a longest sequence of data points that is consistent with the marine vessel hours estimate;

deleting any data points falling outside the longest sequence of data points that is consistent;

generating service schedule for the marine vessel engine; and transmitting the service schedule to a processor of the marine vessel asset management information system; and setting and/or adjusting, via the processor of the marine vessel asset management information system, a maintenance schedule for the marine vessel engine based on the service schedule.

15. A computer program product including a non-transitory computer-readable medium having instructions stored thereon that when executed will cause a computing device or system to operate a marine vessel asset management information system by performing steps of:

receive, by a service configurator, input data from plural data sources, the input data including:

marine vessel engine installation information;

marine vessel engine running hour information from a marine vessel engine running hours storage system, wherein said marine vessel engine running hour information includes data points obtained on a basis of measurements performed at a marine vessel engine site, and wherein said data points have been transferred to and stored at the marine vessel engine running hours storage system;

marine vessel identification and movement data;

generate, by the service configurator, a dynamic marine vessel engine running hour model by:

combining the marine vessel engine installation information, the marine vessel engine running hour information and the marine vessel identification and movement data; and enriching the marine engine running hour information with marine vessel identification and movement data before determining the predicted running hour information, wherein said step of enriching comprises:

computing a marine vessel hours estimate on a basis of the marine vessel identification and movement data, wherein the marine vessel hours estimate indicates a number of hours the marine vessel was in motion on a given time period; and identifying that data points in the marine vessel engine running hour information are inconsistent, when at least one of the following conditions is fulfilled:

marine vessel engine running hours of the marine vessel with a single main marine vessel engine on a given time period falls outside ±5% from the corresponding marine vessel hours estimate on the given time period;

marine engine running hours for main marine vessel engines employed in the marine vessel with multiple main marine vessel engines on a given time period are equal or higher than 105% of a corresponding marine vessel hours estimate on the given time period; and/or daily average running hours for at least one marine vessel engine employed in the marine vessel with multiple main marine vessel engines are not between 0 and 24 hours;

determine, via the service configurator, predicted running hour information based on the dynamic marine vessel engine running hour model;

perform, via the service configurator, the following:

when inconsistent data points are identified, analyzing data points in the marine vessel engine running hours storage system for finding a longest sequence of data points that is consistent with the marine vessel hours estimate;

deleting any data points falling outside the longest sequence of data points that is consistent;

generating service schedule for the marine vessel engine; and transmitting the service schedule to a processor of the marine vessel asset management information system; and setting and/or adjusting, via the processor of the marine vessel asset management information system, a maintenance schedule for the marine vessel engine based on the service schedule.

* * * * *